United States Patent
Gharpure et al.

(10) Patent No.: US 9,852,544 B2
(45) Date of Patent: *Dec. 26, 2017

(54) METHODS AND SYSTEMS FOR PROVIDING A PRELOADER ANIMATION FOR IMAGE VIEWERS

(71) Applicant: Google Inc., Mountain View, CA (US)

(72) Inventors: Chaitanya Gharpure, Santa Clara, CA (US); Thor Lewis, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,046

(22) Filed: Oct. 11, 2016

(65) Prior Publication Data

US 2017/0032568 A1    Feb. 2, 2017

Related U.S. Application Data

(63) Continuation of application No. 14/101,439, filed on Dec. 10, 2013, now Pat. No. 9,519,999.

(51) Int. Cl.
*G06T 17/00* (2006.01)
*G06T 17/20* (2006.01)
*G06T 7/00* (2017.01)
*G06T 13/20* (2011.01)
*G06T 15/04* (2011.01)
(Continued)

(52) U.S. Cl.
CPC ........... *G06T 17/20* (2013.01); *G06T 7/00* (2013.01); *G06T 13/20* (2013.01); *G06T 15/04* (2013.01); *G06T 15/60* (2013.01); *G06T 15/80* (2013.01); *G06T 17/00* (2013.01); *G06T 17/205* (2013.01); *G06T 2210/08* (2013.01); *G06T 2210/16* (2013.01)

(58) Field of Classification Search
CPC combination set(s) only.
See application file for complete search history.

(56) References Cited

U.S. PATENT DOCUMENTS

2003/0090523 A1    5/2003  Hayashi et al.
2004/0207662 A1*  10/2004  Anderson .............. G06T 17/20
                                                                715/772
(Continued)

OTHER PUBLICATIONS

Hoppe, Hugues. "Progressive meshes." Proceedings of the 23rd annual conference on Computer graphics and interactive techniques. ACM, 1996.*

*Primary Examiner* — Ryan M Gray
(74) *Attorney, Agent, or Firm* — McDonnell Boehnen Hulbert & Berghoff LLP

(57) ABSTRACT

Methods and systems for providing a preloader animation for image viewers is provided. An example method includes receiving an image of an object, determining an edge gradient value for pixels of the image, and selecting pixels representative of the object that have a respective edge gradient value above a threshold. The example method also includes determining a model of the object including an approximate outline of the object and structures internal to the outline that are oriented based on the selected pixels being coupling points between the structures, and providing instructions to display the model in an incremental manner so as to render given structures of the model over time.

20 Claims, 10 Drawing Sheets

(51) Int. Cl.
    *G06T 15/60*    (2006.01)
    *G06T 15/80*    (2011.01)

(56) References Cited

U.S. PATENT DOCUMENTS

| | | |
|---|---|---|
| 2005/0052459 A1 | 3/2005 | Lewis |
| 2009/0079743 A1 | 3/2009 | Pearson et al. |
| 2009/0276541 A1* | 11/2009 | Lock .................... H04N 19/647 |
| | | 709/247 |
| 2012/0256914 A1* | 10/2012 | Chevochot .......... G06F 17/5004 |
| | | 345/419 |
| 2013/0124148 A1 | 5/2013 | Jin et al. |
| 2013/0176304 A1* | 7/2013 | Hu .......................... G06T 17/20 |
| | | 345/420 |

* cited by examiner

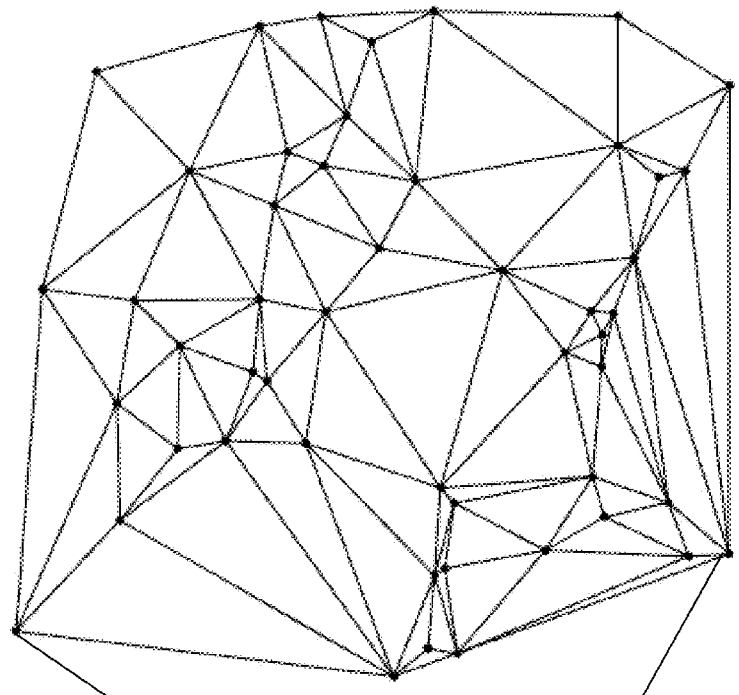
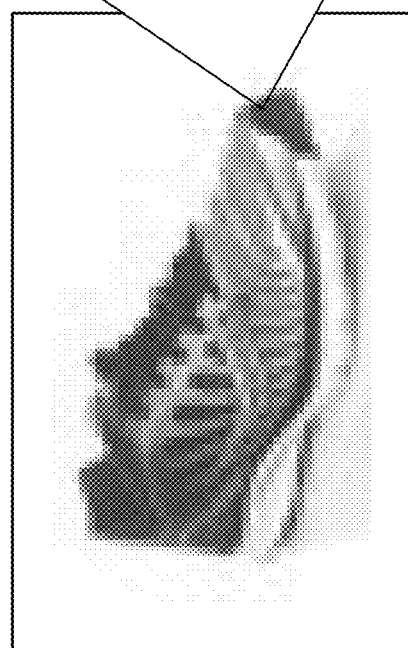
FIG. 5B
FIG. 5A

METHODS AND SYSTEMS FOR PROVIDING A PRELOADER ANIMATION FOR IMAGE VIEWERS

CROSS-REFERENCE TO RELATED APPLICATION

The present disclosure is a continuation of U.S. patent application Ser. No. 14/101,439 filed on Dec. 10, 2013, the entire contents of which are herein incorporated by reference.

BACKGROUND

In computer graphics, three-dimensional (3D) modeling involves generation of a representation of a 3D surface of an object. The representation may be referred to as a 3D object data model, and can be rendered or displayed as a two-dimensional (2D) image via 3D rendering or displayed as a 3D image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or by scanning objects, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be rendered and displayed using a number of different types of interfaces. Example interfaces may provide functionality to enable interaction between a user and the 3D models.

SUMMARY

In one aspect, a method is provided that comprises receiving an image of an object, determining an edge gradient value for pixels of the image, selecting pixels representative of the object that have a respective edge gradient value above a threshold, and determining, by a computing device, a model of the object including an approximate outline of the object and structures internal to the outline that are oriented based on the selected pixels being coupling points between the structures. The method also comprises providing instructions to display the model in an incremental manner so as to render given structures of the model over time.

In another aspect, a non-transitory computer readable medium having stored therein instructions, that when executed by a computing device, cause the computing device to perform functions is provided. The functions comprise receiving an image of an object, determining an edge gradient value for pixels of the image, and selecting pixels representative of the object that have a respective edge gradient value above a threshold. The functions also comprise determining a model of the object including an approximate outline of the object and structures internal to the outline that are oriented based on the selected pixels being coupling points between the structures, and providing instructions to display the model in an incremental manner so as to render given structures of the model over time.

In yet another aspect, a device is provided comprising one or more processors, and data storage configured to store instructions executable by the one or more processors to cause the device to receive an image of an object, determine an edge gradient value for pixels of the image, and select pixels representative of the object that have a respective edge gradient value above a threshold. The instructions may be further executable by the one or more processors to cause the device to determine a model of the object including an approximate outline of the object and structures internal to the outline that are oriented based on the selected pixels being coupling points between the structures, and provide instructions to display the model in an incremental manner so as to render given structures of the model over time.

In still another aspect, a system is provided that comprises a means for receiving an image of an object, a means for determining an edge gradient value for pixels of the image, and a means for selecting pixels representative of the object that have a respective edge gradient value above a threshold. The system also comprises a means for determining a model of the object including an approximate outline of the object and structures internal to the outline that are oriented based on the selected pixels being coupling points between the structures, and a means for providing instructions to display the model in an incremental manner so as to render given structures of the model over time.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5A is an example image that may be used to determine a model for a preloader.

FIG. 5B illustrates an example triangulation generated for a portion of the shoe in the image in FIG. 5A.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Within examples, methods and systems are provided for a preloader animation for image viewers. An example method includes receiving an image of an object, determining an edge gradient value for pixels of the image, and selecting pixels representative of the object that have a respective edge gradient value above a threshold. The example method also includes determining a model of the object including an approximate outline of the object and structures internal to the outline that are oriented based on the selected pixels being coupling points between the structures, and providing instructions to display the model in an incremental manner so as to render given structures of the model over time. The model of the object may be displayed during a download of a file, and a portion of the object displayed is indicative of a progress of the file download. The object may be representative of the file being downloaded so as to provide a preview to a user during the download, and the preview further indicates the download progress.

Figure 1:
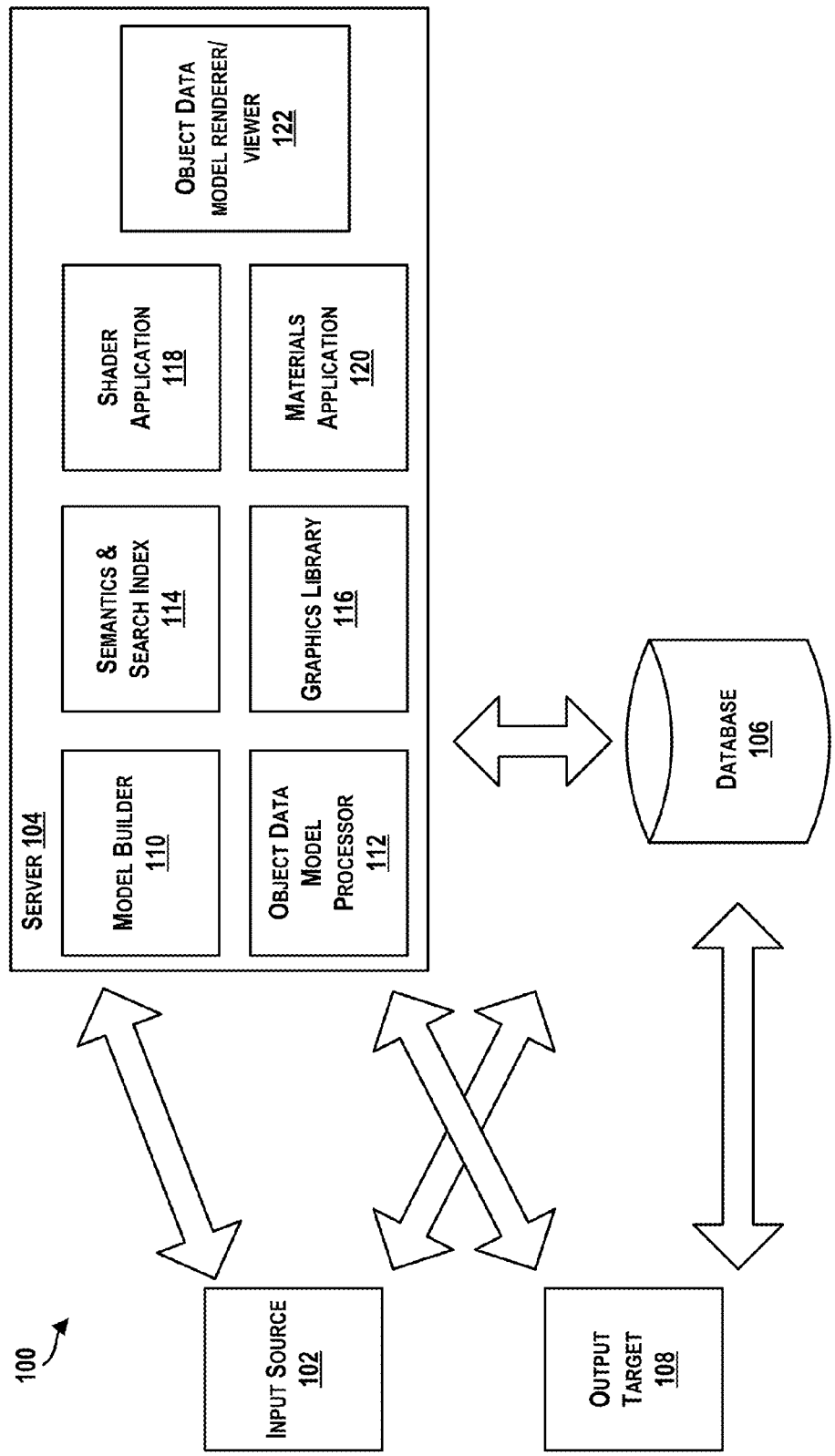
FIG. 1 illustrates an example system for object data modeling, in accordance with one example.

Referring now to the figures, FIG. 1 illustrates an example system 100 for object data modeling, in accordance with one example. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as short-range wireless, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution SLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example, and may take the form of a computing device.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets H that have colors but no UV (coordinate system of a 2D texture space) unwrapping to generate a mesh D with UV unwrapping but no colors. As an example, for a single output texture pixel of an image processing may include, for a given point in UV determine a triangle in the mesh's UV mapping D, and using triangle-local coordinates, move to an associated 3D point on the mesh. A bidirectional ray may be cast along the triangle's normal to intersect with the mesh H, and color, normal and displacement may be used for an output. To generate an entire texture image, each pixel in the image can be processed.

In some examples, the model builder 110 or the object data model processor 112 may output a 3D object data model of an object that includes one file with a combination of all data needed to render a 3D image of the object. In other examples, the model builder 110 or the object data model processor 112 may output a 3D object data model in the form of multiple files so that the 3D object data model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or to files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, a computing device, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
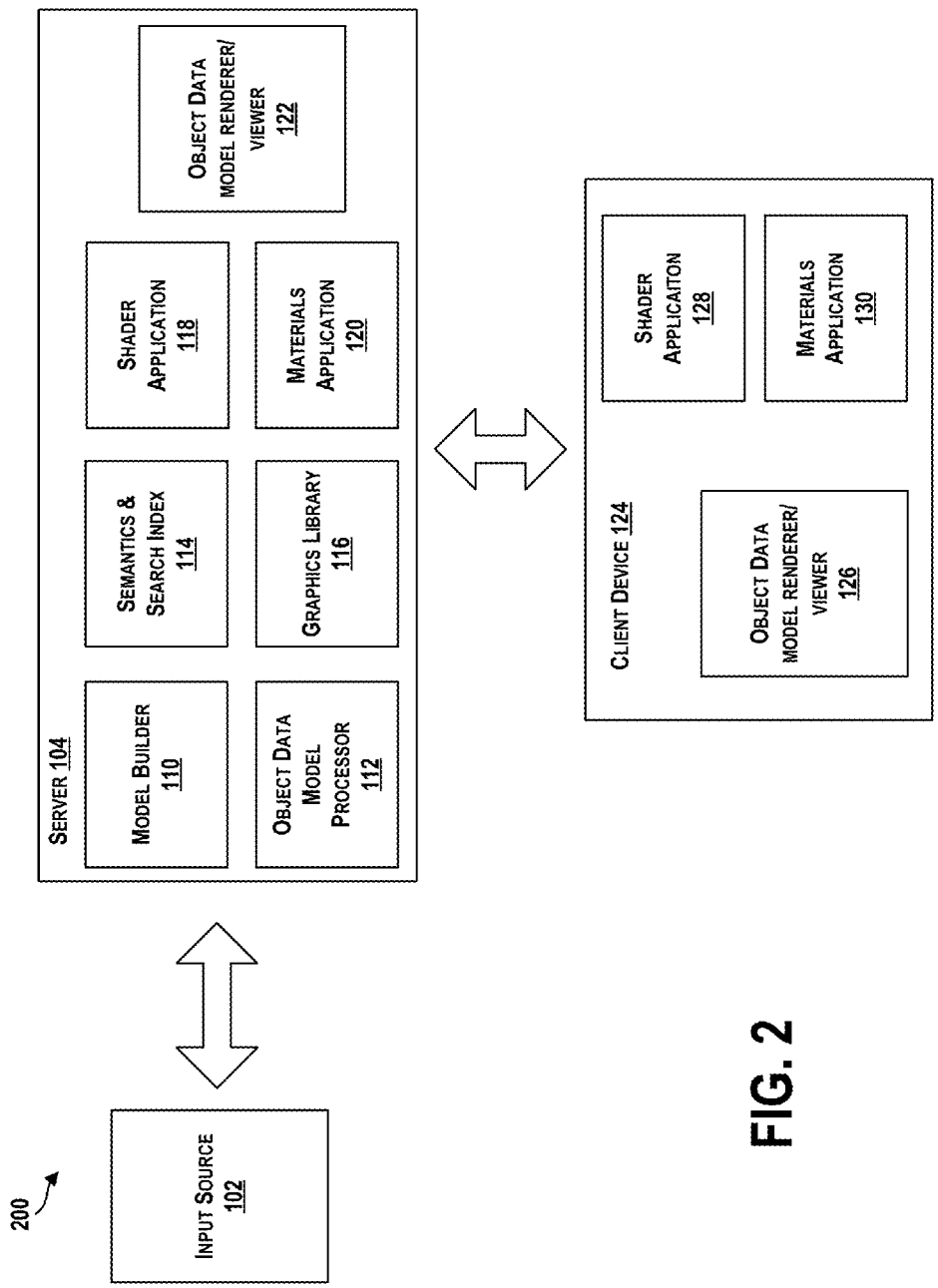
FIG. 2 illustrates another example system for object data modeling, in accordance with one example.

FIG. 2 illustrates another example system 200 for object data modeling, in accordance with one example. The system 200 includes the input source 102 coupled to the server 104, which is coupled to a client device 124. The input source 102 and the server 104 may be as described in FIG. 1. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described with respect to FIG. 1.

In some examples, the client device 124 may receive the 3D object data model file or files from the server 104 and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply.

In some examples, the client device 124 may receive the 3D object data model file or files from the server 104 and render a 3D image of the object. In other examples, the server 104 may render a 3D image of the object and stream the 3D image to the client device 124 for display.

As described, in some examples, the 3D object data model may include various forms of data, such as raw image data captured, mesh data, processed data, etc. Data of the 3D object data model may be encoded and compressed so as to store information related to 3D geometry of an object associated with information related to appearance of the object for transmission and display within a web browser or application on a device.

In one example, data of the 3D object data model may be compressed by initially encoding a triangle mesh representing the 3D object as a list including a plurality of vertices and a plurality of indices. Each vertex in the list may have several arbitrary parameters associated with the vertex, including, but not limited to, position, surface normal, and texture coordinates. The triangle indices may be stored in a 16-bit unsigned integer format and vertex attributes may be stored in a 32-bit floating point format. The 32-bit floating point format vertex attributes may be reduced to 15-bits. In instances in which compressed data is for a version of a web browser or application that does not have the ability to decompress dictionary encoded data, a delta compression may be used to store differences between the triangle indices and vertex attributes, either in an array of structures layout or a transposed layout. After delta compression, post-delta data may be ZigZag encoded (e.g., using open-source Protocol Buffer library available from Google Inc.). Encoding may follow the format ZigZag(x): (x<<1)^(x>>15) with a corresponding decoding (during decompression) to follow the format UnZigZag(x): (x>>1)^(-x & 1)). ZigZag encoding may be followed by multi-byte character encoding using UTF-8 encoding. Finally, the UTF-8 encoded data may be compressed using GNU Gzip or bzip2 to generate a compressed 3D object data model file.

The compressed copy of the 3D object data model file may be stored in a database, such as the database 106 in FIG. 1, in the server 104, or on the client device 124, for example. In some examples, the compressed 3D object data model file may be provided by the server 104 to the client device 124 in response to a request from the client device 124. If using a web browser to view the 3D object data model file, the client device 124 may decompress the compressed 3D object data model file according to Java instructions provided in the object browser web page. A local copy of the object browser web page and a local copy of the uncompressed, searchable data of the 3D object data model file can be stored in local memory of the client device 124. The client device 124 may display exemplary screenshots of an initial default view of a 3D object, based on the searchable data of the 3D object data model file loaded in the web browser.

In some examples, the 3D object data file includes information as to geometry of an object sorted by material and divided into portions to be loaded as fragments and reassembled in portions by the client device. As one example, for a mobile phone comprising multiple parts, each part may be rendered using a separate or distinct shader for each material. Thus, the 3D object data file may be divided into multiple portions and compressed as described above to retain all portions. The client device may receive the compressed 3D object data file, decompress the file, and reassemble the portions of the object one-by-one by loading each fragment of the file, streaming file requests for each shader, and reassembling an image of the object.

Examples described herein relate to images of an object that are displayed in a 3D image viewer used to view a 3D image of the object, such as the object data model renderer/viewer 122 and the object data model renderer/viewer 126 in FIGS. 1 and 2. The 3D image viewer may be provided by a webpage loaded by a computing device, and the computing device may receive images while loading the webpage or upon executing a request to load the webpage.

Figure 3:
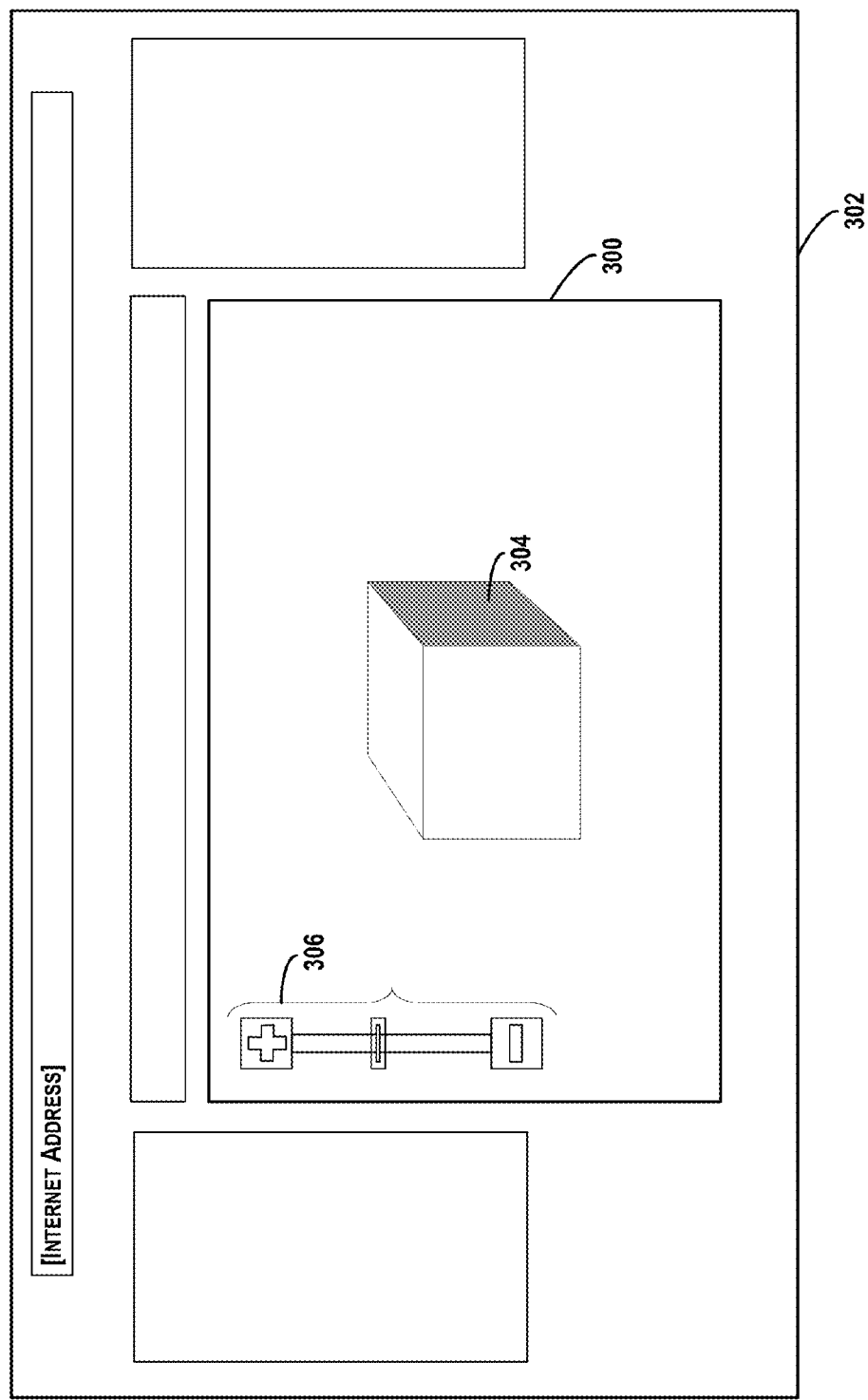
FIG. 3 shows an example 3D image viewer provided within a webpage.

FIG. 3 shows an example 3D image viewer 300 provided within a webpage 302. The webpage 302 may include miscellaneous information and content such as textual content, graphics, hyperlinks, etc. The 3D image viewer 300 may be configured to render a 3D object data model of an object so as to generate a 3D image 304. In some examples, the 3D image viewer 300 may be configured to receive images, videos, and or other information associated with rendering the 3D object data model from a server to allow JavaScript or other scripting languages to generate the 3D image 304 of the object within the 3D image viewer.

In some examples, the 3D image viewer 300 may be an interactive, real-time 3D image viewer, and the information associated with rendering the 3D object data model may be commands or function calls associated with WebGL, OpenGL ES, or other graphics software for rendering real-time, interactive 3D graphics. In other examples, the 3D image viewer 300 may be a swivel viewer.

The 3D image 304 may be an interactive 3D graphic with which a user may interact in the 3D image viewer 300, and may be one image within a data file of the 3D object data model. For example, a user may pan, orbit, or zoom the 3D image 304 via an input device or method. As such, the 3D image viewer 300 may include a zooming tool 306 such that a user may be able to zoom in or out to focus on features or components of the 3D image 304 displayed in the 3D image viewer 300. In other instances, a user may zoom on components of the object by scrolling a wheel of a mouse or providing a gesture on a touchscreen. Other tools, capabilities, and functionalities are also possible.

In some examples, the parameters for the 3D image viewer 300 and/or the 3D object data model may be input with reference to an application programming interface (API) (e.g., HTML5 video API). As such, a computing device displaying the webpage may load one or more libraries associated with the API to provide functionality. In some embodiments, HTML5 video encoding may be used.

Markup language defining the webpage, such as HTML, HTML5, and XML, among others, may include a portion of code associated with the 3D image viewer to be embedded within the webpage. For example, the 3D image viewer 300 may be embedded within an inline frame (iframe) of HMTL language thus sandboxing the 3D image viewer 300 from the webpage and thereby enabling the 3D image viewer 300 to be modified on the webpage without requiring the entire webpage to be updated, so as to decrease latency for the webpage.

In some examples, the embedded language may define customization parameters for the 3D image viewer 300 such as one or more embeddable buttons (such as buttons within the 3D image viewer that a user may click or select to cause a function). For instance, clicking an embeddable button may cause a 3D image within the 3D image viewer 300 to spin or rotate. In another instance, an embeddable button may cause a 3D image to snap or transition to a predetermined camera position or object pose. In yet another instance, clicking an embeddable button may cause the 3D image viewer 300 to zoom in on or zoom out from the 3D image. In other examples, the embedded language may define customization parameters for a 3D object data model to be rendered by the 3D image viewer 300. For instance, parameters may define a 3D pose, a camera position, a level of zoom, an animation sequence, an annotation for a component of the 3D object data model, a shader, a mesh resolution or size, etc., for the 3D object data model.

In some examples, the embedded language may describe when to load or render a 3D object data model within the 3D image viewer 300. For example, the 3D object data model may be rendered when the webpage is loaded. In one instance, a still two-dimensional image may be loaded initially as a placeholder/substitute for the 3D image while the 3D object data model loads. In some instances, the still image may take a fraction of a second to load, and may be replaced once the 3D object data model has loaded (e.g., after 3 seconds).

The still image may be an image that is rendered by a server based on the parameters associated with rendering the 3D object data model and sent to the webpage. For instance, if embedded language defines a background, level of zoom, and camera position for the 3D object data model, a 3D image of the 3D object data model having the appropriate background, level of zoom, and camera position may be rendered from the 3D object data model in the server and sent to the webpage of the client device. In other examples, the 3D object data model may be rendered when a user clicks on the embedded viewer or when a user scrolls down a webpage such that the embedded viewer is visible.

In some examples, the location of the 3D image viewer 300 may be defined within the embedded language by reserving a space in a web browser's document object model (DOM). The embedded language may also include instructions for controlling interactions with the 3D image. For example, JavaScript may define events based on user interface events such as a click, double-click, mouse up, mouse down, etc. over and/or near the 3D image. In one instance, clicking and dragging may enable a user to rotate the 3D image. It is also contemplated that the 3D image may be provided on other interfaces (e.g., touchscreen interfaces) and may be controlled with respect to input methods of the respective interfaces. Responses to any number of functionalities of the embedded 3D image viewer may also be defined within the embedded language.

In further examples, the 3D image viewer 300 may be provided as a standalone viewer outside of a webpage, and may be executed separately from the webpage 302.

Within examples, a 3D object data model may be large in size, and loading a 3D object data model into the 3D image viewer can result in a time consuming process. A progress bar or spinning icon can be provided to notify a user that the 3D object data model is loading. Within examples herein, a preloader is provided that may be displayed to resemble the object/scene whose swivel or 3D object data model is being loaded to provide a preview of the 3D object data model. In addition, an approximate loading progress can be conveyed via the preloader without displaying percentage of assets loaded by an amount of data displayed in the preloader. Data displayed in the preloader can be derived from data of the 3D object data model.

Figure 4:
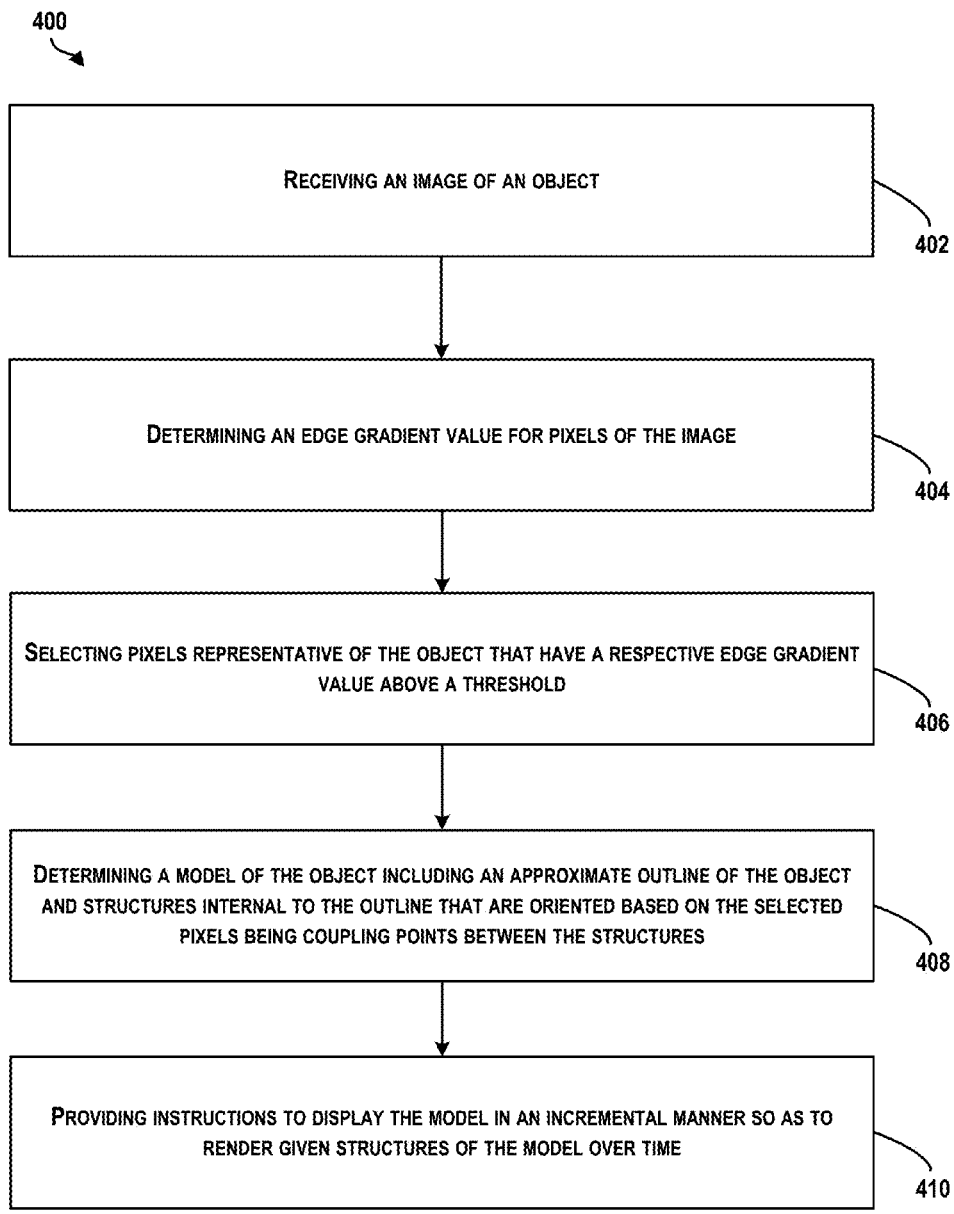
FIG. 4 is a block diagram of an example method.

FIG. 4 is a block diagram of an example method. Method 400 shown in FIG. 4 presents an embodiment of a method that could be used by the systems 100 or 200 of FIGS. 1-2 or components of the systems 100 or 200, for example. Method 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device, and may be distinguished from transitory mediums.

In addition, for the method 400 and other processes and methods disclosed herein, each block in FIG. 4 may represent circuitry that is wired to perform the specific logical functions in the process.

Initially, at block 402, the method 400 includes receiving an image of an object. The image of the object may be received in a number of manners. In one example, the image is used as a display for a viewer during at a time when the viewer is downloading a 3D object data model. In this example, a computing device may initiate download of the 3D object data model, and select as the image, a first image or frame of the 3D object data model (e.g., the poster image). The poster image may be the first frame of the 3D object data model, or other frames within an initial portion of the 3D object data model being downloaded.

In other examples, the computing device may initiate download of a 3D object data model for a given object, and may retrieve a general image of an image within a category of objects that relates to the 3D object data model from a search engine. As a specific example, the 3D object data model may be of a specific shoe, and the computing device may retrieve an image of a general shoe from the Internet for use as a preloader.

At block 404, the method 400 includes determining an edge gradient value for pixels of the image. In one example, an edge detector may process the image to create a gradient bitmap. A gradient value can be associated with each pixel, and a higher gradient value represents a more hard edge. An example edge detector may perform discrete differentiations to compute an approximation of the gradient of an image intensity function. At each point in the image, a result of the detector is either a corresponding gradient vector or a norm of this vector. An example edge detector includes the Sobel operator, which is based on convolving the image with a small, separable, and integer valued filter in horizontal and vertical directions. Edges detected in the image may correspond to variations in color within pixels (e.g., as color changes, the gradient value increases).

At block 406, the method 400 includes selecting pixels representative of the object that have a respective edge gradient value above a threshold. For example, to select pixels representative of the object versus pixels representative of other components or background of the image, the image may include the object and a processed background in which the processed background includes pixels of a common color. Thus, all pixels having the common color can be determined, and pixels in the image other than the pixels having the common color can be sampled and selected. The image may have been processed to flatten the image so as to reduce pixels other than the object to be white in instances in which the image is taken from a 3D object data model. Thus, in that example, a color check can be performed to determine if a pixel is inside or outside the object displayed in the image (e.g., when sampling points in the image by color, non-white pixels are pixels of object).

In other examples, pixel selection can be performed by identifying objects in a foreground and performing a classification of foreground and background pixels. Foreground classification can be used by comparing images with training images in which objects have been identified to identify the objects in the image. Other foreground classifications exist as well to segment a foreground object from background information based on color changes in the image, geometric changes of shapes in the images, or other illustrative changes as well.

Next to determine those selected pixels that have edge gradient values above a threshold, each of the pixels may have an associated gradient value, and a filtering can be performed to select those above a certain gradient value. It may be desired to select more pixels on edges of the object (e.g., to outline the object) and less pixels on other areas of the object. A random selection of pixels that fall inside the object, weighted by gradient values of the pixels, can be performed. Thus, it is desirable to select pixels having higher gradient values than those with lower gradient values (e.g., non-edge pixels). Depending on a scale used for the gradient determination, if the values are scaled to be in the range 0 to 255, a threshold may be about half (e.g., 128) to be selected. In any event, whatever scale may be used for the gradient values, a threshold may be a halfway point in the scale, for example. The threshold may be set higher, such as to be 60%, 75%, or 90% of the scale as well.

At block 408, the method 400 includes determining, by a computing device, a model of the object including an approximate outline of the object and structures internal to the outline that are oriented based on the selected pixels being coupling points between the structures. Within examples, when pixels having high gradient values are chosen, those pixels likely represent edges of the object and can be used as an outline of the object. The object may then be partitioned into a number of internal structures, and the structures internal to the outline may include circles, cylinders, polygons, or other shapes.

In one example, the structures include triangles, the model of the object can be determined using a Delaunay triangulation of the object based on the selected pixels being vertices of the triangles. An end result may be to build a triangulation of the object that gives an effect or an illusion of building a mesh of the object. Thus, using edge weights to select pixels as vertices for the Delaunay triangulation gives the illusion of the mesh having an actual shape of the object. A Delaunay triangulation for a set P of points in a plane is a triangulation DT(P) such that no point in P is inside the circumcircle of any triangle in DT(P). Delaunay triangulations maximize a minimum angle of all angles of the triangles in the triangulation. For a set of points on a same line, there is no Delaunay triangulation (the notion of triangulation is degenerate for this case). For four or more points on a same circle (e.g., the vertices of a rectangle) the Delaunay triangulation is not unique and each of the two possible triangulations that split the quadrangle into two triangles satisfies the Delaunay condition, i.e., the requirement that the circumcircles of all triangles have empty interiors.

In other examples, the model of the object may be determined by selecting pixels having the highest gradient values as an outline, and filling in the outline with any type of internal structures partitioned based on the pixels being coupling points of the structures. Instead of showing a mesh of triangles for the object, the object can be populated with circles of various shapes or sizes, or with various shapes of any size using the selected pixels as vertices of those shapes or centers of the shapes (e.g., centers of the circles). Any number of combination of type and size of internal structures can be used to create the model.

In still other examples, the model of the object may be determined using a Voronoi diagram (similar to a Delaunay triangulation), or still other known structural generation techniques to fill an area.

Additional visual components of the model may be determined as well, such as determining colors of the internal structures based on a color of the pixel used for the coupling points between the structures or based on a combination of respective colors of the selected pixels of coupling points between the structures. A size of given structures can be determined based on an apparent distance of a portion of the object represented by the selected pixel to a viewing location (e.g., portion of the object farther away can be represented by smaller internal structures when depth information is known).

At block 410, the method 400 includes providing instructions to display the model in an incremental manner so as to render given structures of the model over time. Thus, within examples, the model is displayed to illustrate portions of the object in the image at a time to create an illusion that the object is being constructed. The instructions may be provided to a preloader for an image viewer and may include a set of colored vertices, a set of Delaunay triangles for those vertices, and triangle edge colors, as well as instructions on how to render the preloader animation so that it appears like geometry being constructed by actually triangulation of the original image. Over time, fading can be provided to eventually present a rendering of the image.

The instructions to display the model may include configurable parameters such as a time to display vertices, a time to display triangles, a time to fill triangles, a time to reveal the image, and time to fade the animation. Other parameters may include rendering the given structures of the model in focus based on an apparent distance of a portion of the object represented by the selected pixel to a viewing location, such that those closer are rendered in focus and those further away are rendered out of focus. For each parameter, there is a duration, as well as a number of structures and speed to reveal. Parameters may be determined based on a type of the object. A final display may appear as a same size as the image so that it looks like the object being created and generated. The original image is eventually loaded and seamlessly fades in.

The parameters may control how fast each display in the animation occurs. Within examples, the method 400 may be performed to render the model over time when downloading a 3D object data model of the object, which includes geometry and texture information of the object for display in an image viewer. Thus, while the 3D object data model is being downloaded, which can take some time due to large file size, the model may be rendered as a preloader to the user. A total duration of the animation of the preloaded can be associated to a time to download the 3D object data model. A fraction of preloader being rendered dictates a progress of the download, thus giving a user a rough idea of the download progress.

The animation occurs in an order in which the configurable parameters above are specified, such as to display vertices incrementally, display colored triangles incrementally, fill the triangles incrementally, reveal a part of the actual image under each triangle incrementally, and fade out the animation layer to display the actual image.

In some examples, the pixels can be sorted in an order based on vertical position of the pixels in the image, and instructions can be provided to display the model in the incremental manner so as to render the given structures of the model over time based on the vertical position from a bottom to a top of the model. This may create an illusion that the object is being constructed in the viewer.

Thus, within examples, the method 400 may be performed after initiating a download of a three-dimensional (3D) object data model of the object, and a first frame of the 3D object data model can be selected as the image of the object so as to render a display resembling the object of the 3D object data model being downloaded and provide a preview of the 3D object data model. The model of the object can be determined while downloading the 3D object data model, the preloader can provide the incremental display to provide a representation of the object being constructed over time. A duration of display of the model is about equal to an amount of time to download the 3D object data model and a portion of the model displayed is indicative of a progress of the download (e.g., more of the model being displayed indicates more of the file being downloaded).

In other examples, the model may be pre-computed and loaded as a separate file to the image viewer before downloading the 3D object data model. A small amount of data (e.g., an image) is enough to generate the preloader versus the entirety of the 3D object data model. The preloader may provide an alternative to a progress bar or a spinner icon to indicate a download is in progress.

FIG. 5A is an example image that may be used to determine a model for a preloader. The image includes a shoe, and the background has been flattened out as white pixels. FIG. 5B illustrates a triangulation generated for a portion of the shoe. Vertices of the triangles are chosen based on pixels in the shoe having high edge gradient values. In the example in FIG. 5B, the triangulation represents a front edge of the shoe. An entirety of the shoe may be represented by the triangulation as shown in FIG. 5B.

Figure 6A:
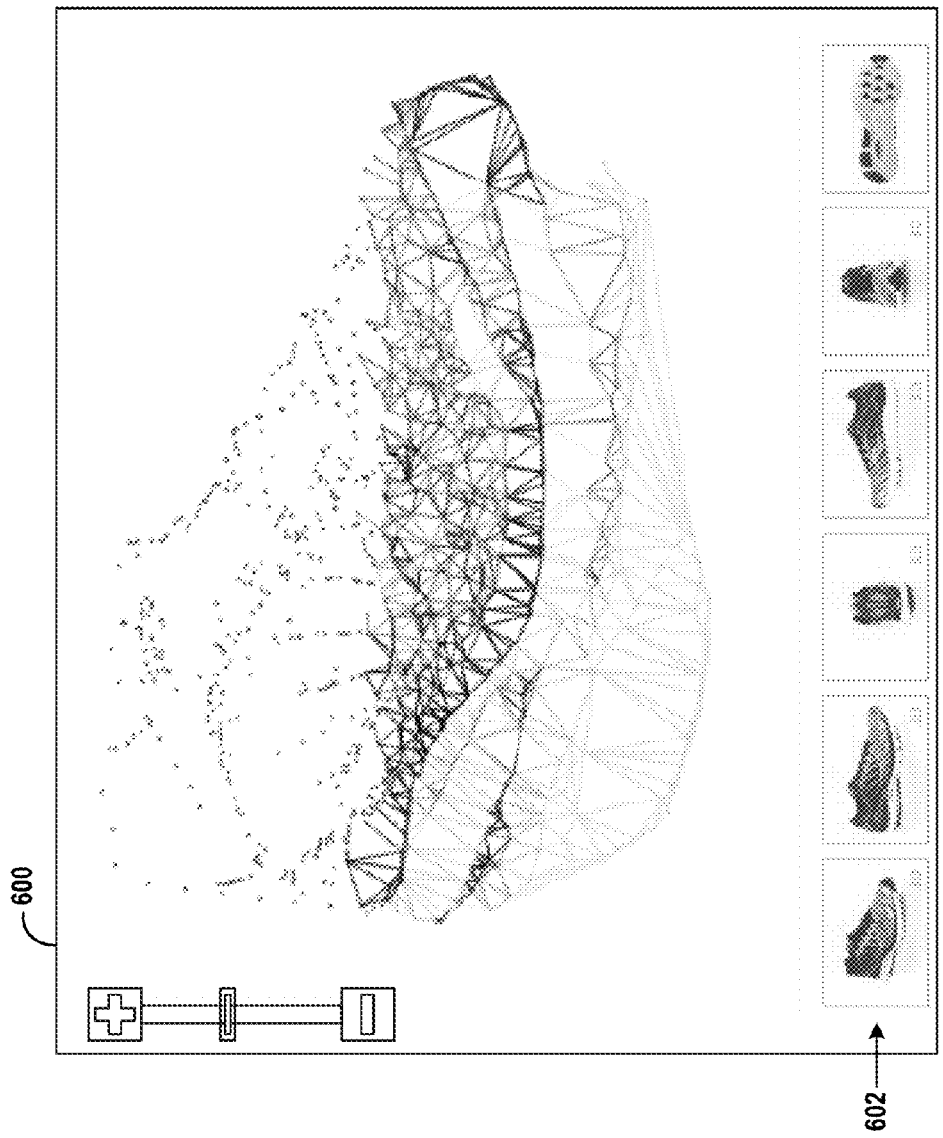
FIGS. 6A-6C illustrate an example display of a swivel viewer.
Figure 6B:
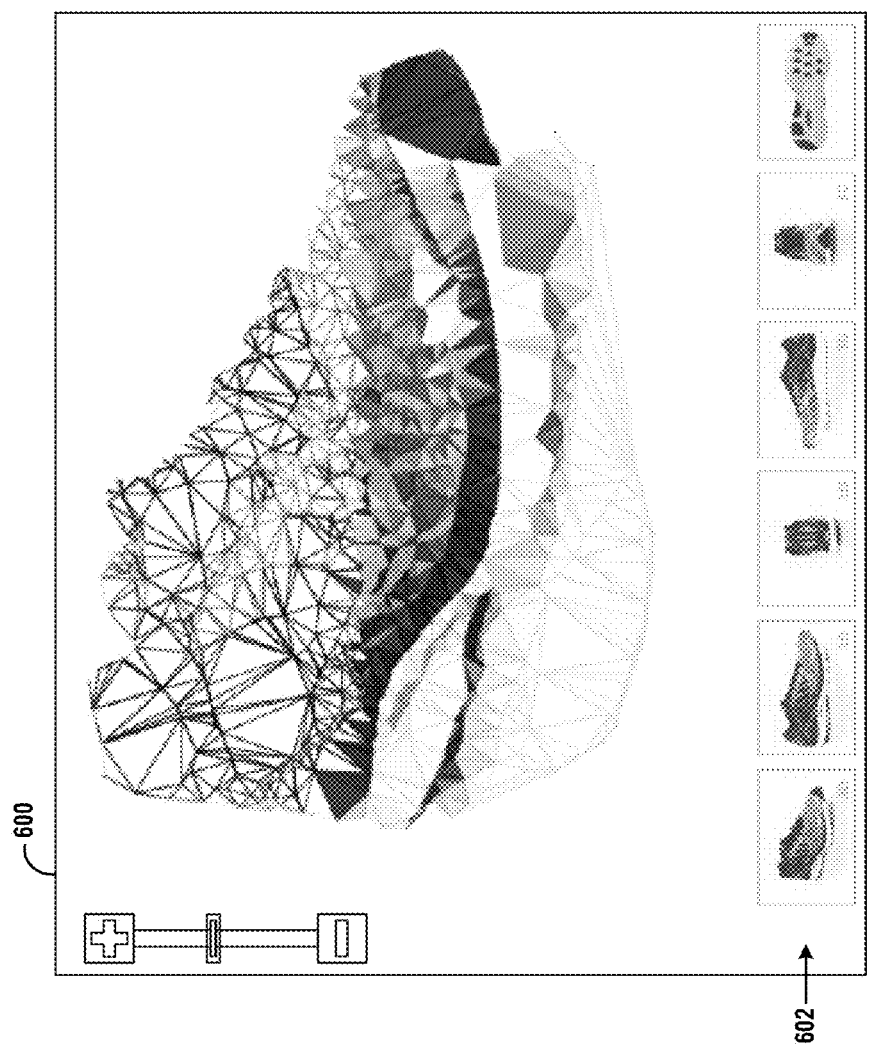
Figure 6C:
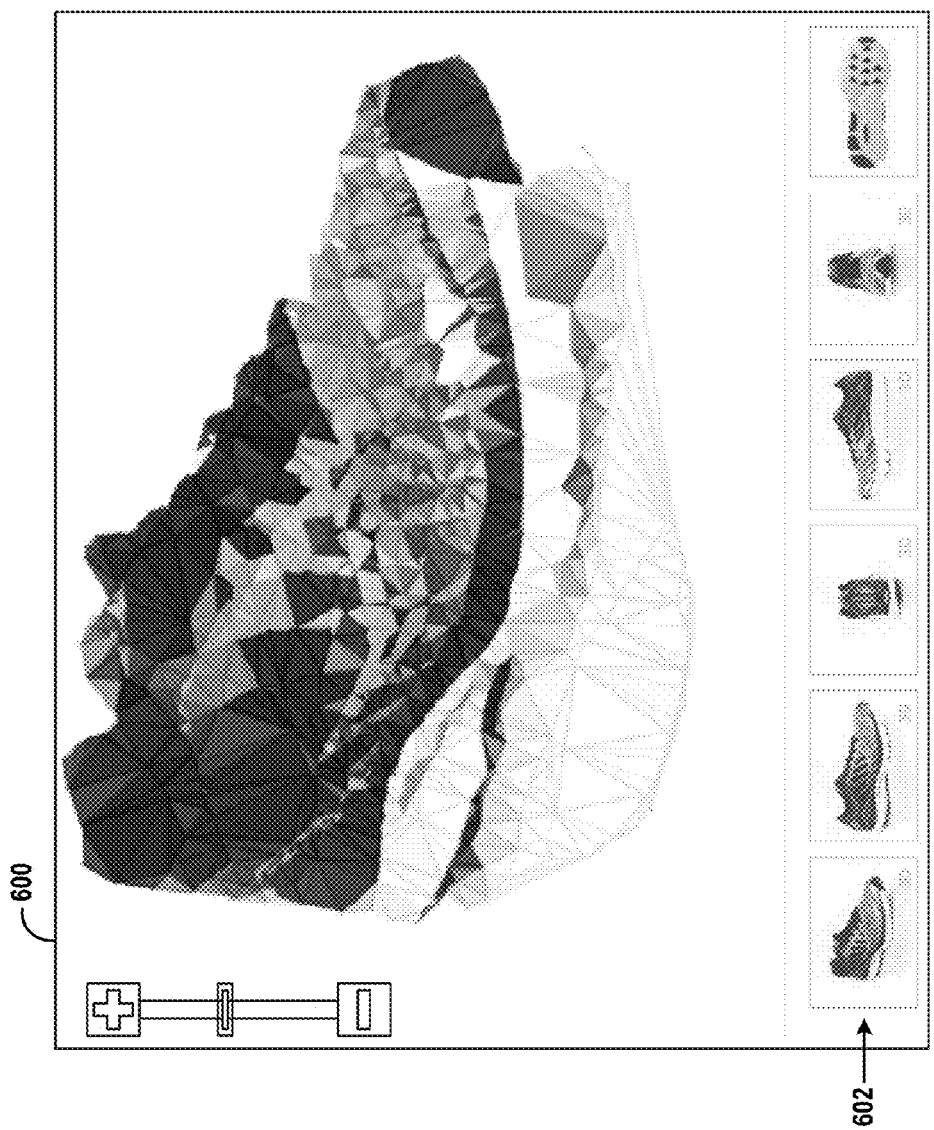

FIGS. 6A-6C illustrate an example display of a swivel viewer 600. It should be understood that the functions performed with respect to the swivel viewer 600 may be performed, additionally or alternatively, by another type of 3D image viewer, such as a real-time, interactive 3D image viewer, that is configured similarly to or differently from the swivel viewer 600.

The swivel viewer 600 may be configured to render a 3D object data model by displaying images of an object captured from a multiple respective views of the object. In some examples, a user may click or otherwise input a modification to the swivel viewer to cause other images of the object to be displayed. For instance, the other images may be images of the object rendered from separate positions around an axis of rotation of the object. In one example, a user may click and drag to the left or right to cause the image displayed by the swivel viewer 600 to change. In another example, a user may perform a gesture (e.g., a swipe) on a touchscreen interface to cause the image displayed by the swivel viewer 600 to be replaced by a different image.

During download of the 3D object data model, a first few images may of the 3D object data model may be selected and provided as multiple snapshots 602 that a user may select to cause those images to be displayed by the swivel viewer 600 to rotate to a given image. For instance, the snapshots 602 may include a perspective, front, right, back, left, top, and bottom view images.

In one example implementation, a 3D object data model may include hundreds of images to be rendered by the swivel viewer 600 that are generated from hundreds of predetermined positions covering 360 degrees around the object. The images may, for instance, be captured at 5 degree increments (i.e., 0 degrees, 5 degrees, 10 degrees . . . 355 degrees). During download of the 3D object data model, the method 400 may be performed to determine a model of the object to be displayed as a preloader.

FIG. 6A illustrates a portion of a model of the shoe being rendered. As shown, the model is rendered from bottom to top to illustrate the object being constructed. In this example, the model includes an outline of the shoe filled with triangles coupled by selected pixels as vertices. Animation of the preloader is generated to first display the triangles at the bottom of the shoe, display other portions of the model, e.g., vertices of a top portion of the shoe. An amount of the model display is indicative of a progress of the download of the 3D object data model. In the example shown in FIG. 6A, about 25% of the model is shown, and thus, the file download may be about 25% complete.

FIG. 6B illustrates another portion of the model of the shoe being rendered. In FIG. 6B, triangles at a bottom of the shoe have been filled in, and the triangles at the top of the shoe have been drawn. The model in FIG. 6B may be about 50% rendered, and thus, at this point the file download may be about 50% complete.

FIG. 6C illustrates another portion of the model of the shoe being rendered. In FIG. 6C, all triangles have been filled in, and the model may now be complete. Thus, the file download may be complete at this time, and the swivel viewer 600 may subsequently fade the model out to display the image of the object (e.g., a first or poster image of the downloaded 3D object data model).

Within the examples shown in FIGS. 6A-6C, the model generated and displayed includes a portion representing a shadow of the object (e.g., a shadow of the shoe represented by the triangular mesh underneath the shoe). In other examples, the shadow may be removed, and pixels representative of only the object can be used for generation of the model for the preloader.

Figure 7:
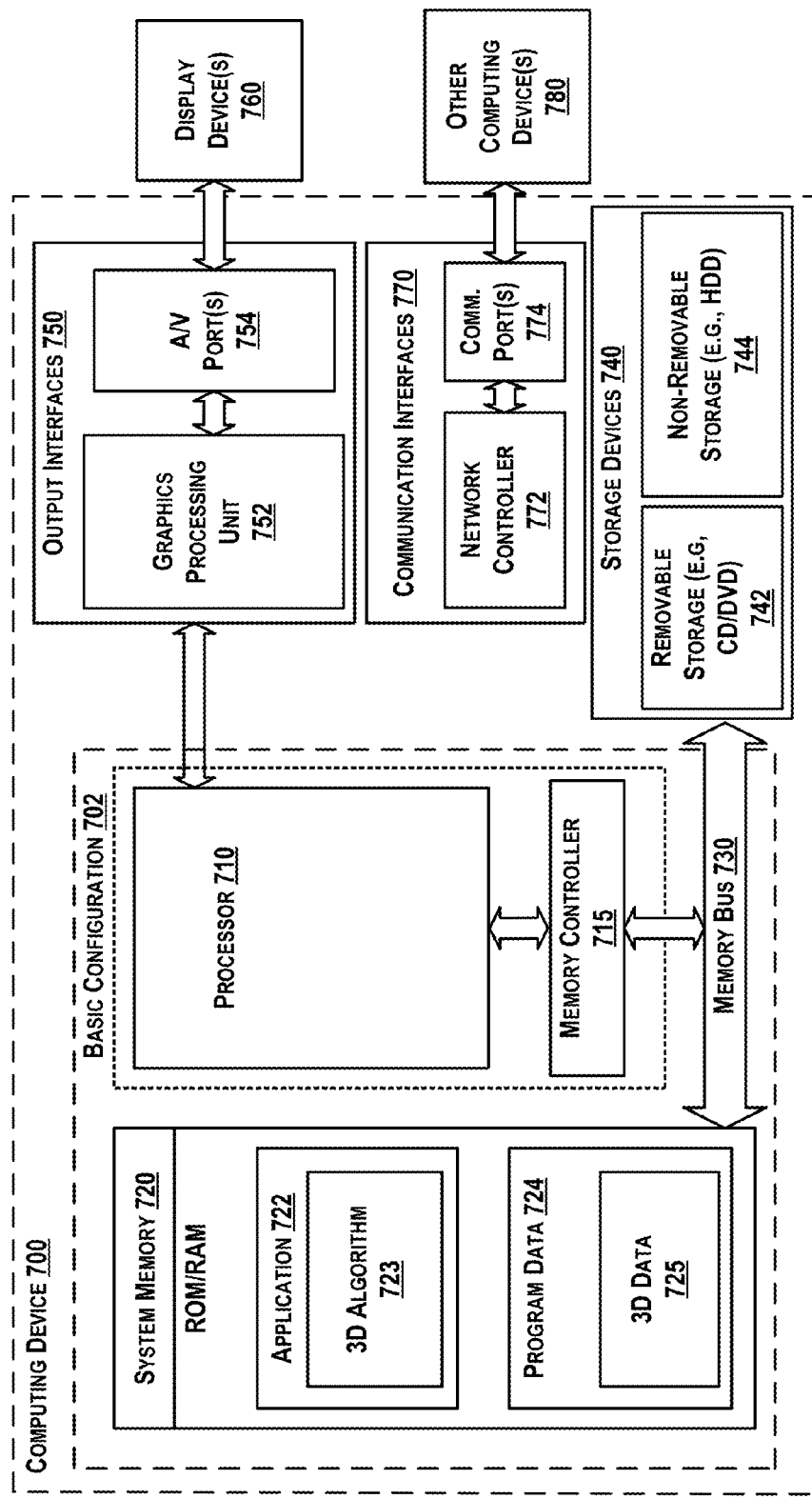
FIG. 7 is a functional block diagram illustrating an example computing device used in a computing system that is arranged in accordance with at least some embodiments described herein.

FIG. 7 is a functional block diagram illustrating an example computing device 700 used in a computing system that is arranged in accordance with at least some embodiments described herein. The computing device 700 may be a personal computer, mobile device, cellular phone, touch-sensitive wristwatch, tablet computer, video game system, and may be implemented to provide a system for viewing dynamic high-resolution 3D imagery over a network, as described above. In a basic configuration 702, computing device 700 may typically include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 may include one or more applications 722, and program data 724. Application 722 may include a 3D algorithm 723 that is arranged to provide inputs to the electronic circuits, in accordance with the present disclosure. Program data 724 may include 3D information 725 that could be directed to any number of types of data. In some example embodiments, application 722 can be arranged to operate with program data 724 on an operating system.

Computing device 700 can have additional features or functionality, and additional interfaces to facilitate communications between the basic configuration 702 and any devices and interfaces. For example, data storage devices 740 can be provided including removable storage devices 742, non-removable storage devices 744, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 720 and storage devices 740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include output interfaces 750 that may include a graphics processing unit 752, which can be configured to communicate to various external devices such as display devices 760 or speakers via one or more A/V ports 754 or a communication interface 770. The communication interface 770 may include a network controller 772, which can be arranged to facilitate communications with one or more other computing devices 780 over a network communication via one or more communication ports 774. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

Figure 8:
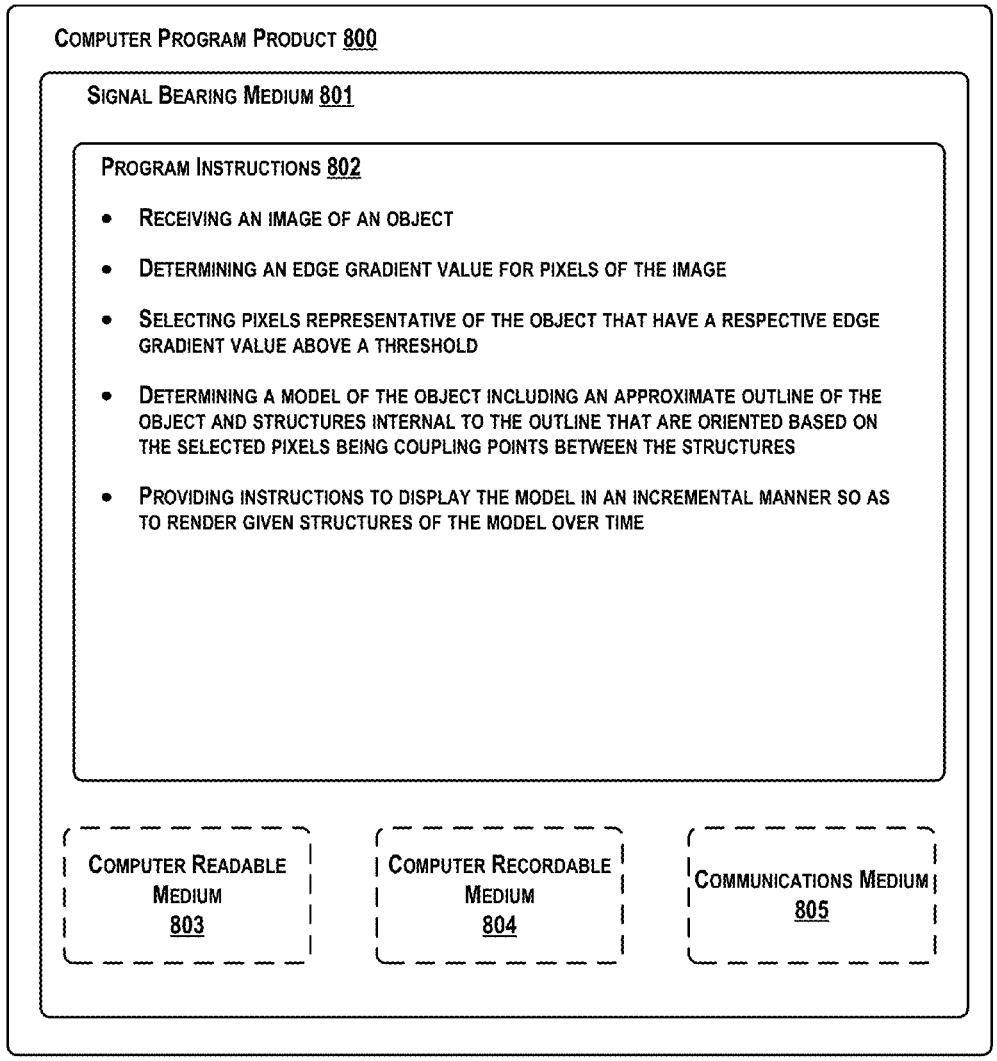
FIG. 8 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-7. In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 700 of FIG. 7 may be configured to provide various operations, functions, or actions in response to the programming instructions 802 conveyed to the computing device 700 by one or more of the computer readable medium 803, the computer recordable medium 804, and/or the communications medium 805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   downloading a three-dimensional (3D) object data model of an object;
   selecting a given frame of the 3D object data model as an image of the object;
   determining, by a computing device, a model of the object including an approximate outline of the object and structures internal to the outline;
   providing instructions to display the model in an incremental manner during the downloading of the 3D object data model so as to render given structures of the model over time during the downloading of the 3D object data model, wherein a duration of display of the model is about an amount of time to download the 3D object data model and a portion of the model displayed is indicative of a progress of the download of the 3D object data model, and wherein the display of the model incrementally resembles geometry and texture attributes of the rendered given structures to represent the image of the object in the given frame.

2. The method of claim 1, wherein the structures internal to the outline include triangles, and wherein determining the model of the object comprises determining a Delaunay triangulation of the object.

3. The method of claim 1, wherein the structures internal to the outline include one or more of circles, cylinders, or polygons.

4. The method of claim 1, wherein the instructions to display the model include one or more of a time to display given structures, a time to fill the given structures, a time to reveal a representation of the object, and a time to fade the representation of the object.

5. The method of claim 1, wherein the instructions to display the model include a speed to render the given structures of the model.

6. The method of claim 1, further comprising:
determining an edge gradient value for pixels of the image; and
selecting pixels representative of the object that have a respective edge gradient value above a threshold.

7. The method of claim 6, further comprising:
determining the approximate outline of the object and structures internal to the outline as being oriented based on the selected pixels being coupling points between the structures.

8. The method of claim 6,
wherein the image includes the object and a processed background, and wherein the processed background has pixels of a common color, and wherein the method further comprises:
determining pixels having the common color;
sampling pixels in the image other than the pixels having the common color; and
determining the edge gradient value for the sampled pixels of the image.

9. The method of claim 6, further comprising:
sorting the pixels in an order based on vertical position of the pixels in the image; and
providing instructions to display the model in the incremental manner so as to render the given structures of the model over time based on the vertical position from a bottom to a top of the model.

10. The method of claim 6, further comprising determining a color of the structures based on a color of the selected pixels of coupling points between the structures or based on a combination of respective colors of the selected pixels of coupling points between the structures.

11. The method of claim 6, further comprising determining a size of given structures based on an apparent distance of a portion of the object represented by the selected pixel to a viewing location.

12. The method of claim 6, further comprising:
providing instructions to display the model in an incremental manner so as to render the given structures of the model in focus based on an apparent distance of a portion of the object represented by the selected pixel to a viewing location.

13. The method of claim 1, further comprising:
revealing, in the incremental manner, a portion of the image of the object corresponding to a given structure associated with one or more pixels of the portion of the image so as to display the image of the object.

14. The method of claim 1, further comprising:
selecting a first frame of the 3D object data model as the image of the object so as to render a display resembling the object of the 3D object data model being downloaded and provide a preview of the 3D object data model.

15. The method of claim 14, wherein determining the model of the object comprises determining the model of the object while downloading the 3D object data model, and the method further comprises:
providing instructions to display the model of the object in the incremental manner during the downloading so as to provide a representation of the object being constructed over time.

16. A non-transitory computer readable medium having stored therein instructions, that when executed by a computing device, cause the computing device to perform functions comprising:
downloading a three-dimensional (3D) object data model of an object;
selecting a given frame of the 3D object data model as an image of the object;
determining a model of the object including an approximate outline of the object and structures internal to the outline; and
providing instructions to display the model in an incremental manner during the downloading of the 3D object data model so as to render given structures of the model over time during the downloading of the 3D object data model, wherein a duration of display of the model is about an amount of time to download the 3D object data model and a portion of the model displayed is indicative of a progress of the download of the 3D object data model, and wherein the display of the model incrementally resembles geometry and texture attributes of the rendered given structures to represent the image of the object in the given frame.

17. The non-transitory computer readable medium of claim 16, wherein the functions further comprise:
providing instructions to display the model that resembles the object of the 3D object data model being downloaded so as to provide a preview of the 3D object data model; and
revealing, in the incremental manner, a portion of the image of the object corresponding to a given structure associated with one or more pixels of the portion of the image so as to display the image of the object.

18. A device comprising:
one or more processors; and
data storage configured to store instructions executable by the one or more processors to cause the device to:
download a three-dimensional (3D) object data model of an object;
selecting a given frame of the 3D object data model as an image of the object;
determine a model of the object including an approximate outline of the object and structures internal to the outline; and
providing instructions to display the model in an incremental manner during the downloading of the 3D object data model so as to render given structures of the model over time during the downloading of the 3D object data model, wherein a duration of display of the model is about an amount of time to download the 3D object data model and a portion of the model displayed is indicative of a progress of the download of the 3D object data model, and wherein the display of the model incrementally resembles geometry and texture attributes of the rendered given structures to represent the image of the object in the given frame.

19. The device of claim 18, wherein the instructions are further executable by the one or more processors to cause the device to:
   select a first frame of the 3D object data model as the image of the object so as to render a display resembling the object of the 3D object data model being downloaded and provide a preview of the 3D object data model.

20. The device of claim 18, wherein the instructions are further executable by the one or more processors to cause the device to:
   sort the pixels in an order based on vertical position of the pixels in the image; and
   provide instructions to display the model in the incremental manner so as to render the given structures of the model over time based on the vertical position from a bottom to a top of the model.

* * * * *